United States Patent
Di Lello

[15] 3,693,156
[45] Sept. 19, 1972

[54] MEANS FOR INTERFACING AN EXISTING MANUAL IMPRINTER WITH A REMOTELY OPERATED, CREDIT CHECK CONTROL SYSTEM

[72] Inventor: John Di Lello, Warminster, Pa.
[73] Assignee: Credit Systems, Inc., Colmar, Pa.
[22] Filed: May 11, 1970
[21] Appl. No.: 36,068

[52] U.S. Cl. ........................... 340/149 R, 101/269
[51] Int. Cl. ..................... G08b 5/00, H04q 9/00
[58] Field of Search ... 340/149 A; 235/60.51, 61.7 B, 235/61.9; 101/269, 274, 282, 282 X, 283, 283 X, 284, 284 X, 285, 285 X

[56] References Cited

UNITED STATES PATENTS 3,308,238  3/1967  Brothman et al. ...... 101/284 X
3,514,754  5/1970  Schwend ................. 340/149

Primary Examiner—Donald J. Yusko
Attorney—Sperry and Zoda

[57] ABSTRACT

A conventional manual imprinter, of the kind used to imprint sales slips with credit card information by manual operation of a printing roller, is linked to a remotely located computerized central memory in which credit information is stored. A supporting structure receiving the imprinter includes a latch that normally prevents operation of the roller. A keyboard on the structure is operable by the user to transmit to a central memory the account identification as shown on the credit card. If the response from the central memory is affirmative the latch is tripped electrically and disengages the roller to allow manual operation thereof. If the response is negative, the latch remains engaged and imprinting of the sales slip is thus prevented.

3 Claims, 5 Drawing Figures

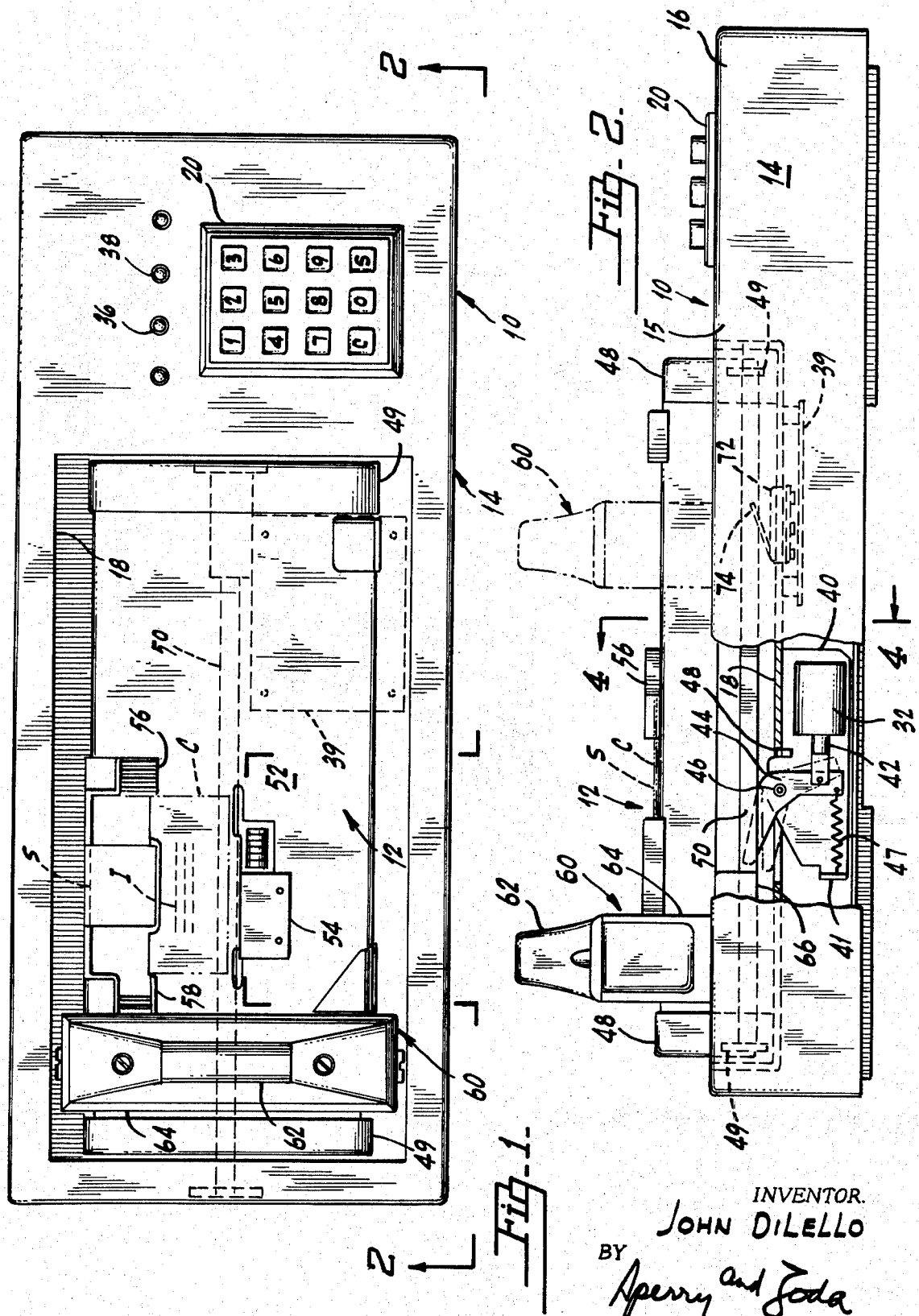

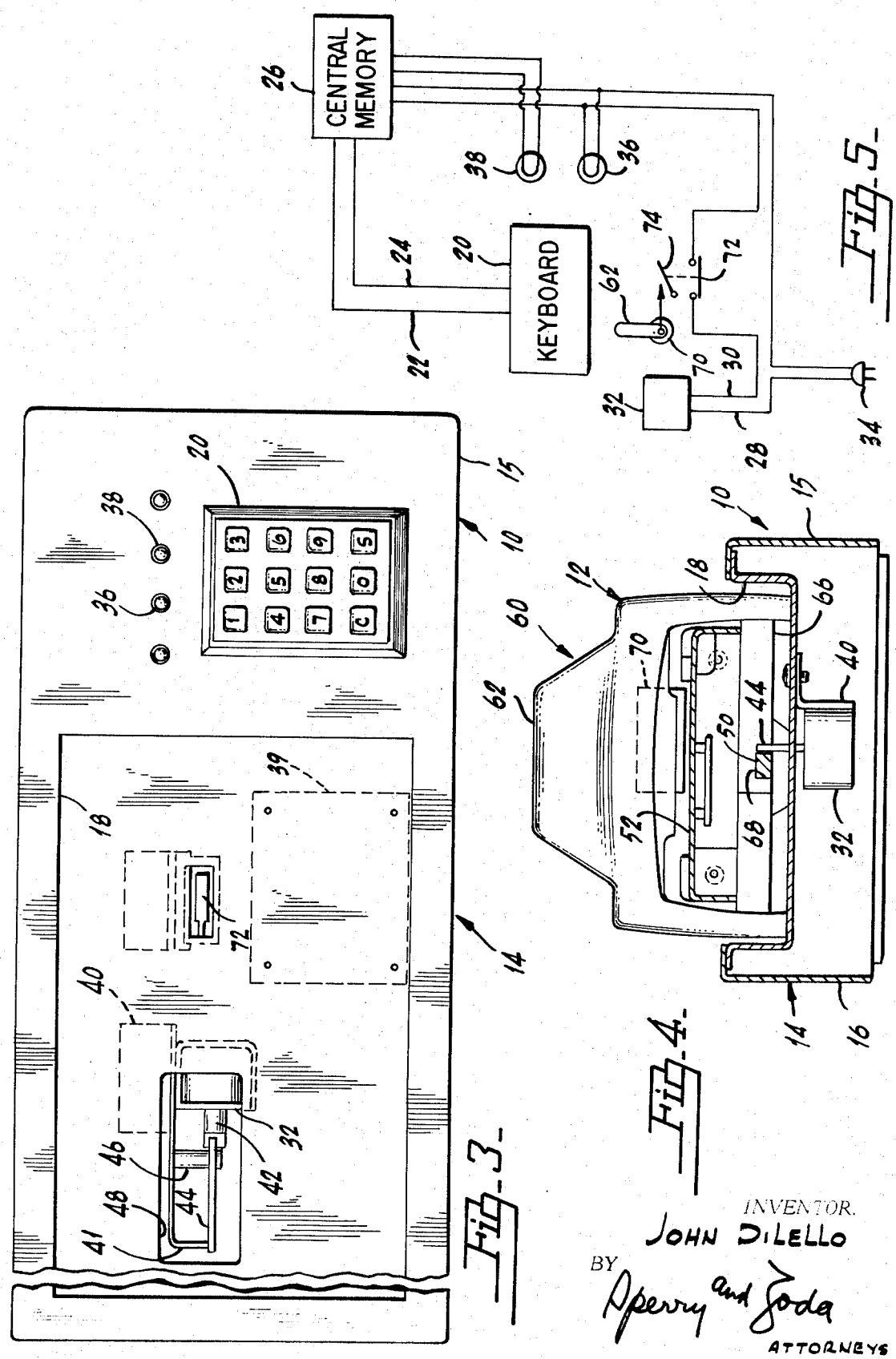

MEANS FOR INTERFACING AN EXISTING MANUAL IMPRINTER WITH A REMOTELY OPERATED, CREDIT CHECK CONTROL SYSTEM

BACKGROUND OF THE INVENTION

1. Field of the Invention

The invention relates generally to electrical communications, and in particular to those incorporating a selective function wherein transmission of a selected impulse to a remote location produces at said location an electrical comparison of said impulse with stored intelligence to effect a return signal which, according to the stored intelligence, will be either affirmative or negative.

Apparatus having the characteristics described above is usable in any of various fields. One field in which it can be employed to particular advantage is consumer credit information. Thus, in a department store, a salesperson is enabled to insert a customer's coded credit card in the apparatus constituting the present invention; punch into the apparatus an identification of the credit card; and receive almost instantaneously intelligence from the remote location, as to whether the customer is or is not permitted to charge the purchase.

In the above-mentioned co-pending application, a so-called terminal unit, that is, a unit located at the sales counter or other point of sale, is designed as a complete, self-contained piece of equipment including means to receive the credit card and sales slip, means to transmit electrically to a remote location identification of the credit card, and means to automatically imprint the sales slip with the credit card identification if (and only if) an affirmative, "good credit" response is received from the remotely located, computerized, central memory where the credit information is stored and kept current.

The present invention, while falling in the general field of inventive activity described above, couples a conventional, manual imprinter with means coupling the same to the remotely located central memory in such manner as to permit operation of the manual imprinter only if an affirmative response is received from the remotely located central memory. In other words, the field of invention involves the coupling of a completely conventional manual imprinter to a remote central memory in such a way that the imprinter operation becomes controlled by said central memory.

2. Description of the Prior Art

It is already known to provide terminal or counter units designed to control imprinting of a sales slip from a remotely located central memory, after identification of the customer's account to said central memory and receipt of a "good credit" impulse from the central memory.

The prior art also contains manual imprinters, operated wholly mechanically by the sales person, without control from a remotely located store of credit information. Such imprinters are in use, for example, at almost all gasoline service stations, and customarily are provided with a manually operated roller assembly, adapted to transverse a superposed credit card and sales record, to transfer to the sales record or slip, the identification of the customer's account found upon the credit card.

Heretofore, however, there has not to my knowledge been a coupling of a completely conventional manual imprinter of the type describe immediately above, to a remotely located, computerized central memory.

The desirability of coupling a conventional manual imprinter to a remotely located central memory can be readily appreciated, when it is considered that the ordinary terminal unit is a comparatively expensive piece of equipment. When it is considered that such a unit should desirably be located at each counter in a large department store, or at each point of sale of any other type of large merchandising operation, the expense becomes very great. It is desirable, accordingly, to provide a low-cost terminal unit, which will lower the cost of such a unit to a marked degree, while differing basically from the self-contained, more expensive units only in that the sales person must operate the roller manually after receipt of the affirmative credit response.

SUMMARY OF THE INVENTION

Summarized briefly, the present invention comprises two main components. One of these is a completely conventional manual imprinter of the type in which the operator places a credit card and sales slip, and thereafter operates a roller assembly to imprint the sales slip with the credit card information. The other main component is a supporting structure of the imprinter, including an electrically controlled latch that prevents movement of the roller assembly, a keyboard whereby the user may transmit to a central memory the identification of the credit card, and circuitry that trips the latch in the presence of an affirmative credit impulse transmitted from the central memory.

By reason of the novel coupling for effecting remotely controlled latching of a manual imprinter to a computerized store of credit information, it becomes possible to achieve the benefits of computerized control of the extension of credit, while still embodying in the necessary terminal units a low-cost imprint assembly capable of purchase on the open market, usable with no modification whatsoever, and operatively connected to the supporting structure merely by positioning the imprinter in a mounting recess provided in said structure.

BRIEF DESCRIPTION OF THE DRAWING

FIG. 1 is a top plan view of an imprinter and its associated support structure, operatively related according to the present invention;

FIG. 2 is a view partly in side elevation and partly in longitudinal section, substantially on line 2 — 2 of FIG. 1, the latch being shown in full and dotted lines in its latching and release positions, respectively;

FIG. 3 is a top plan view, portions being broken away, of the supporting structure per se;

FIG. 4 is a transverse sectional view through the apparatus, substantially on line 4 — 4 of FIG. 2; and FIG. 5 is a schematic view showing a typical circuit that can be employed in practicing the invention.

DESCRIPTION OF THE PREFERRED EMBODIMENT

Designated generally at 10 is a terminal unit according to the present invention. A manual imprinter generally designated 12 is incorporated in the terminal unit as one of the two main components thereof, and is mounted upon a supporting structure generally designated 14, comprising the other main component of the present invention.

Considering the construction of the supporting structure, this includes a housing 15 of elongated, rectangular configuration, having an elongated, deep well 18 extending from a location adjacent one end of the housing and terminating well short of the other end thereof, as clearly shown in FIG. 1.

Mounted in the top wall of the housing, in spaced relation to the well, is a keyboard 20 which in the illustrated example has keys bearing numerical indicia 0 through 9.

Referring to FIG. 5, a circuit connection is provided between the keyboard and a central memory, in which the opposite sides 22, 24 of said circuit are schematically illustrated as connected to the remotely located central memory 26.

A central memory can be located wherever desired, it being necessary only that an electrical connection be provided between the keyboard and said central memory such as to permit the sales person to punch into the keyboard the identification number of the customer's credit card, an act which results in transmission of the identification number electrically through the circuit connections 22, 24 to the computerized central memory 26. At that location, the coded identification received from the terminal unit 10 is compared in a manner well-known in the art with stored information as to whether the customer whose account is represented by the identification number has good or bad credit. The central memory then automatically transmits, back to the terminal unit, either an affirmative "good credit" response or a negative "bad credit" response.

Still referring to FIG. 5, a circuit connection is provided from the central memory to the terminal unit, designed to energize a solenoid 32 if the impulse from the central memory is affirmative. An affirmative or "good credit" signal is transmitted through a circuit comprising connections 28, 30, said circuit including the coil of a solenoid 32 mounted within the support structure below well 18, said circuit further including a source of electrical power for the solenoid. In the illustrated example, the source of power is represented by a conventional attachment plug cap 34 connectable to a conventional 110-volt AC supply. Any suitable source of power for the solenoid can of course be included in the circuit.

Also in circuit with the solenoid is a pilot light 36 mounted upon the housing adjacent the keyboard. This pilot light would be green, and would indicate to the sales person that an affirmative credit response has been transmitted to the terminal unit, and that the solenoid has been energized. This is important because the solenoid releases a latch that controls operation of the manual imprinter and only by observing the pilot light can the salesperson know that the latch has been tripped and the manual imprinter has been released for operation.

Also provided on the structure 14 is a red pilot light 38, which as shown in FIG. 5 has a separate circuit connection with the central memory 26, pulsed if the credit response is negative. In this event, the red light is energized, so that the sales person knows that the particular account is bad. As will be noted from FIG. 5, there is no connection between the red light and the solenoid, that is, the solenoid is never energized if the red light 38 is illuminated. The solenoid is energized only if there is an affirmative credit response from the central memory.

A support structure may include, as shown, a printed circuit board 39, in which all the necessary circuit connections between the several keys and the transmission line to the central memory, as well as terminal connections for the solenoid and other electrical components, can be provided. Since these connections are completely conventional, they have not been separately illustrated. It is well within the skill of those working in the art to provide circuit connections between a keyboard and a central memory, designed to transmit a coded identification number of an account to said memory, for comparison with stored intelligence maintained in a current status within the computerized central memory.

Referring now to FIGS. 2 and 4, mounted upon housing 15, on the under side of the bottom wall of the well, is a mounting bracket of inverted L-shape, designated 40 and having a horizontally, forwardly projecting, L-shaped extension (see FIG. 3) 41.

Solenoid 32 is provided (FIG. 2) with a plunger 42, pivotally connected to the vertically depending lower end of a bell crank 44 rocking on a pivot pin 46 carried by bracket extension 41. Bell crank 44 is mounted within an elongated, rectangular opening 48 (See FIG. 3) formed in the bottom wall of well 18. The bell crank, as seen from FIG. 2, projects forward upwardly into the well, through opening 48, to provide a latch for normally preventing movement of the roller assembly of imprinter 12.

The imprinter 12 is a completely conventional device, capable of purchase on the open market. Although the construction of such manual imprinters may very from manufacturer to manufacturer, essentially said imprinters are alike in that each such imprinter includes a movable imprinting assembly adapted to exert pressure upon a superposed credit card and sales slip (the sales slip is normally in multiple) in such fashion as to transfer to the several copies of the sales slip an imprint of identifying information found upon the credit card. Such information normally includes the name and address, and the account number of the credit card holder.

An imprinter of this type is a relatively inexpensive unit, which in its basic essentials comprises no more than a flat bed on which the credit card and slip are supported, and an imprinting assembly (normally a roller type) movable thereover.

In the illustrated example, the imprinter 12 is provided with a frame including transversely disposed end plates 49, between which an elongated, horizontally disposed bar 50 extends, said bar being fixedly secured at its ends to the end plates, and extending longitudinally and centrally of the imprinter as shown in FIG. 1.

Also fixedly secured to and extending between the end plates 48 is a flat, rectangular bed plate 52, having intermediate its ends a plurality of abutments, 54, 56, 58 adapted to facilitate the proper location of a credit card C overlying a sales slip S, and so registered with the sales slip as to cause the identification I of the credit card (See FIG. 1) to be imprinted upon the sales slip when the card and slip are traversed by a roller assembly generally designated 60, movable between its normal full line position shown in FIG. 2 to its dotted line position shown in the same figure of the drawing.

The roller assembly can be alternatively described as an imprinting means, and in the illustrated example comprises, as above noted, a completely conventional component of the imprinter 12. Thus, the roller assembly 60 includes a transversely disposed handle 62, rigidly secured to a yoke 64 of inverted U-shape, provided at its lower end with a crossbar 66 having intermediate its ends a downwardly opening, rectangular notch or recess 68 slidably receiving bar 50. Thus, roller assembly 60 is slidably moved by the user along the guide bar 50.

Connected between the opposite ends of the yoke is an imprinting roller 70 (FIGS. 4 and 5), which exerts a pressure upon the credit card such that raised identifying characters on the card are forced into the multiple copies of the sales slip. The sales slip is provided with carbon paper or other means for reproducing the identification on the several copies of the slip, and the pressure of the roller against the credit card causes the sales slip copies to be imprinted where the embossed characters of the card are forced under pressure by the roller into the sales slip.

As noted from FIG. 4, the yoke and its crossbar 66 extends completely about the bed plate 52 and moves back and forth along the length of the bed plate in normal usage. This is a conventional imprinter, and under normal circumstances the user is free to operate the roller. This is so because under normal circumstances, an imprinter of this type is not under remote control freeing the roller for movement, or preventing such movement, as the case may be.

In accordance with the invention, however, the operation of the roller assembly is controlled remotely, and the sales person or other user is free to operate the roller assembly for the purpose of imprinting the sales slip only if an affirmative credit response is signaled to the device from the computerized central memory.

The control of the imprinter is effected by means of the latch defined by the bell crank 44. As seen in FIGS. 2 and 4, the latch is normally disposed, at its upper end, in the path of movement of the crossbar 66 of the roller assembly. Therefore, as long as the solenoid is deenergized and the latch is in its full line position of FIG. 2, operation of the roller assembly to imprint the sales slip is precluded.

In use, thus, after a purchase has been made the sales person places the credit card and sales slip upon the bed plate 52. Then, the account number is punched into the keyboard by the sales person, and this automatically transmits the account number electrically to the central memory. The central memory in turn makes the necessary comparison of the account number with the stored information. Assuming that the central memory finds the account to be good, an affirmative response is produced, and this therefore travels through the circuit 28, 30 to the solenoid coil. The solenoid is energized, causing the plunger 42 to be retracted and thereby causing the latch to rock to its dotted line position of FIG. 2. In this position, the latch is out of the path of crossbar 66, so that the user is free to shift the roller assembly from the full to the dotted line position of FIG. 2. The sales slip is thus imprinted. The user knows that the roller assembly is free to be so moved, by reason of the fact that the green pilot light 36 is energized simultaneously with the solenoid coil.

The user reciprocates the roller assembly, moving it from the full to the dotted line position and then back to the full line position of FIG. 2. During this movement, the roller assembly will reach the dotted line position of FIG. 2, and the bar 66 thereof will accordingly engage and deflect a switch arm 74 of a switch 72 mounted in the bottom wall of the well 18 (See FIGS. 2 and 3). Referring to FIG. 5, the downward deflection of arm 74 causes the contacts of the switch to be opened. Said contacts are in series circuit with the solenoid coil, so that the solenoid is thus deenergized immediately after passage of the roller assembly over the credit card and sales slip.

When the coil is deenergized, a spring 47 causes the bell crank to swing upwardly to its latching position, and also causes the plunger 42 to return to its normally extended position. As the roller assembly moves back to its normal rest position, it momentarily cams the bell crank downwardly as it passes over the bell crank, but the spring 47 immediately pulls the bell crank in a clockwise direction viewing the same as in FIG. 2, so that once again the roller assembly is latched after a single cycle of operation thereof.

It will be seen that in this way, a low-cost terminal unit is provided, that can be located an any of a large number of points of sale in a single store or chain of stores. The inexpensive terminal units are obviously of very low-cost, since the manual imprinter is completely conventional and is not a high-cost item. The supporting structure, also, is of relatively low cost, incorporating basically a deeply recessed housing, a printed circuit board, the solenoid and latch assembly, the keyboard, and the pilot lights. It may be noted, in this connection, that if the central memory finds the credit to be bad for the particular account identified thereto, the return signal is transmitted only to a red pilot light 38, and not to the solenoid. Thus, the sales person immediately observes, when the red light goes on, that a negative response has been given. In these circumstances, as will be obvious, the sale person cannot operate the roller assembly, since the latch remains in its roller-assembly-locking position.

Further, the device is so designed as to make it extremely difficult, if not completely impossible, to tamper with the latch. The device incorporates a deep well, in which the imprinter fits snugly. The latching mechanism is so designed as to project upwardly into the well medially between the opposite sides of the well, at a location well in from either end of the well. The latch assembly is completely covered by the bed plate, and by the side walls of the well. Therefore, any attempt by the sales person at collusion with the purchaser, with a view to releasing the latch manually in the absence of an affirmative signal from the central memory, is effectively precluded.

It will be apparent that the device is one that is usable to advantage at such locations as department store counters, with the latching of the roller assembly of every unit being controlled from a single remote location where there is stored current credit information. The response from the central memory is almost instantaneous, so that there is no delay in completing the sales transaction if the credit is good.

The device is also usable to particular advantage in such merchandising operations as a chain of gasoline service stations. Heretofore, service stations have been particularly vulnerable to loss. Gasoline credit cards are frequently lost or stolen, and when they fall into the hands of unauthorized individuals, are often put to immediate use in the making of large purchases in a short period of time. In some instances, attempts have been made to control this use of stolen cards, or the use of cards by those whose credit is bad, by posting credit card numbers within each service station. Obviously, this system is inadequate at best. Using the present invention, the imprinters at all service stations in the chain can be tied into a single computer located at any desired location. Not only can credit approval be kept completely up to date with such a system, but it is even possible to quickly located points at which a credit card thief is attempting to operate, thereby to alert police for the purpose of apprehending such an individual.

I claim:

1. In a credit check system, including an imprinter of the type in which a sales slip and a credit card are superimposed for the imprinting of the sales slip with identifying information provided on the card, in response to movement of an imprinting means with respect to the card and slip, and further including apparatus for controlling said movement from a remotely located central memory, in which are stored affirmative and negative responses to the question whether credit should be extended to a credit card holder, the improvement comprising the provision of:

A. a support structure for removably mounting an existing imprinter thereon;
   B. means connected with said support structure for transmitting, to the central memory, for transmitting, to the central memory, an identification of the card with respect to which a response is sought;
   C. latch means on the support structure, normally preventing the movement of the existing imprinting means;
   D. said support structure being formed to present an upwardly facing recess for receiving a base portion of the existing imprinter, said recess being so sized and positioned as to co-operate with the structure of the existing imprinter to conceal the block access to said latch means;
   E. means in said support structure responding to the transmission of an affirmative response from the central memory, with respect to the identified card, to release said latch means and thereby to free the existing imprinting means for imprinting movement; and
   F. the operation of said latch means being controlled by an electrical circuit energized responsive to an affirmative response from said central memory, and normally closed switch means operated by the imprinting means when the imprinting means is moved, effective to de-energize said circuit.

2. The improvement according to claim No. 1, wherein:
   said latch means comprises a solenoid and a bell crank, located on a side of the imprinting means in the direction of imprinting movement;
   said bell crank being pivotally mounted on said supporting structure and normally positioned to impede the movement of the imprinting means;
   said bell crank being swingable downwardly out of the path of movement of the imprinting means when said solenoid is energized.

3. The improvement according to claim No. 2, wherein all of said latch means, with the exception of said bell crank, is mounted wholly within said supporting structure;
   said bell crank projecting upwardly into the well defined by said support means and inclined to engage the imprinting means supported thereabove, to prevent the imprinting movement thereof;
   said bell crank being wholly covered by the existing imprinter to prevent access to said bell crank when the existing imprinter is properly positioned within said recess, formed with said supporting structure; and
   said bell crank being arranged to permit return movement of said imprinting means thereover to its final position, when said solenoid is in a de-energized condition.

* * * * *